(12) United States Patent
Connolly

(10) Patent No.: US 12,447,319 B2
(45) Date of Patent: Oct. 21, 2025

(54) ENHANCED BALLOON BONDING FOR BALLOON GUIDE CATHETERS WHILE MINIMIZING OUTER PROFILES

(71) Applicant: Neuravi Limited, Galway (IE)

(72) Inventor: Patrick Connolly, Galway (IE)

(73) Assignee: NEURAVI LIMITED, Galway (IE)

( * ) Notice: Subject to any disclaimer, the term of this patent is extended or adjusted under 35 U.S.C. 154(b) by 955 days.

(21) Appl. No.: 16/942,699

(22) Filed: Jul. 29, 2020

(65) Prior Publication Data

US 2022/0032016 A1 Feb. 3, 2022

(51) Int. Cl.
  *A61M 25/10* (2013.01)
  *A61M 25/00* (2006.01)

(52) U.S. Cl.
  CPC ...... *A61M 25/1034* (2013.01); *A61M 25/005* (2013.01); *A61M 25/1018* (2013.01); *A61M 25/104* (2013.01)

(58) Field of Classification Search
  CPC ............ A61M 25/1034; A61M 25/005; A61M 25/1018; A61M 25/104
  USPC ....................................................... 604/103
  See application file for complete search history.

(56) References Cited

U.S. PATENT DOCUMENTS

| | | | |
|---|---|---|---|
| 4,147,169 A | 4/1979 | Taylor | |
| 4,168,710 A | 9/1979 | Rosenberg | |
| 5,549,552 A * | 8/1996 | Peters | A61M 25/104 |
| | | | 604/528 |
| 5,897,537 A | 4/1999 | Berg et al. | |
| 9,532,792 B2 | 1/2017 | Galdonik et al. | |
| 9,532,873 B2 | 1/2017 | Kelley | |

(Continued)

FOREIGN PATENT DOCUMENTS

| | | |
|---|---|---|
| EP | 2 719 418 | 4/2014 |
| JP | 2001-238957 A | 9/2001 |
| JP | 2010-029237 A | 2/2010 |
| JP | 2019-533524 A | 11/2019 |
| WO | WO 2018/080926 A1 | 3/2018 |

OTHER PUBLICATIONS

EP search report dated Jan. 21, 2022 for counterpart EP 21 18 8135 (10 pp.) of related co-pending, co-owned U.S. Appl. No. 16/942,671, filed Jul. 29, 2020.

(Continued)

*Primary Examiner* — Phillip A Gray
(74) *Attorney, Agent, or Firm* — Troutman Pepper Locke LLP

(57) ABSTRACT

Balloon guide catheter with a balloon bonded thereto maximizing bonding strength and integrity while minimizing outer profile. Reflow jacket(s) is melted to/embedded within a braid supporting structure of the catheter securing beneath the balloon. Radially arranged apertures and/or recesses may be defined in the balloon through which adhesive is seepable upwards when secured about the catheter shaft. Proximal and distal bond interface areas of the balloon may be skived at right angles into two sections each extending radially 180°. Proximal and/or distal edges of the balloon may be flipped inwards prior to securing to the catheter shaft to form respective proximal and/or inverted bonds. During prepping of the catheter, residual air may be purged from the balloon via an exhaust hole defined in the compliant balloon or an exhaust tube secured between the exterior surface of the catheter shaft and the balloon.

6 Claims, 11 Drawing Sheets

(56) References Cited

U.S. PATENT DOCUMENTS

| | | | |
|---|---|---|---|
| 9,533,344 | B2 | 1/2017 | Monetti et al. |
| 9,539,011 | B2 | 1/2017 | Chen et al. |
| 9,539,022 | B2 | 1/2017 | Bowman |
| 9,539,122 | B2 | 1/2017 | Burke et al. |
| 9,539,382 | B2 | 1/2017 | Nelson |
| 9,549,830 | B2 | 1/2017 | Bruszewski et al. |
| 9,554,805 | B2 | 1/2017 | Tompkins et al. |
| 9,561,125 | B2 | 2/2017 | Bowman et al. |
| 9,572,982 | B2 | 2/2017 | Burnes et al. |
| 9,579,484 | B2 | 2/2017 | Barnell |
| 9,585,642 | B2 | 3/2017 | Dinsmoor et al. |
| 9,615,832 | B2 | 4/2017 | Bose et al. |
| 9,615,951 | B2 | 4/2017 | Bennett et al. |
| 9,622,753 | B2 | 4/2017 | Cox |
| 9,636,115 | B2 | 5/2017 | Henry et al. |
| 9,636,439 | B2 | 5/2017 | Chu et al. |
| 9,642,675 | B2 | 5/2017 | Werneth et al. |
| 9,655,633 | B2 | 5/2017 | Leynov et al. |
| 9,655,645 | B2 | 5/2017 | Staunton |
| 9,655,989 | B2 | 5/2017 | Cruise et al. |
| 9,662,129 | B2 | 5/2017 | Galdonik et al. |
| 9,662,238 | B2 | 5/2017 | Dwork et al. |
| 9,662,425 | B2 | 5/2017 | Lilja et al. |
| 9,668,898 | B2 | 6/2017 | Wong |
| 9,675,477 | B2 | 6/2017 | Thompson |
| 9,675,782 | B2 | 6/2017 | Connolly |
| 9,676,022 | B2 | 6/2017 | Ensign et al. |
| 9,692,557 | B2 | 6/2017 | Murphy |
| 9,693,852 | B2 | 7/2017 | Lam et al. |
| 9,700,262 | B2 | 7/2017 | Janik et al. |
| 9,700,399 | B2 | 7/2017 | Acosta-Acevedo |
| 9,717,421 | B2 | 8/2017 | Griswold et al. |
| 9,717,500 | B2 | 8/2017 | Tieu et al. |
| 9,717,502 | B2 | 8/2017 | Teoh et al. |
| 9,724,103 | B2 | 8/2017 | Cruise et al. |
| 9,724,526 | B2 | 8/2017 | Strother et al. |
| 9,750,565 | B2 | 9/2017 | Bloom et al. |
| 9,757,260 | B2 | 9/2017 | Greenan |
| 9,764,111 | B2 | 9/2017 | Gulachenski |
| 9,770,251 | B2 | 9/2017 | Bowman et al. |
| 9,770,577 | B2 | 9/2017 | Li et al. |
| 9,775,621 | B2 | 10/2017 | Tompkins et al. |
| 9,775,706 | B2 | 10/2017 | Peterson et al. |
| 9,775,732 | B2 | 10/2017 | Khenansho |
| 9,788,800 | B2 | 10/2017 | Mayoras, Jr. |
| 9,795,391 | B2 | 10/2017 | Saatchi et al. |
| 9,801,980 | B2 | 10/2017 | Karino et al. |
| 9,808,599 | B2 | 11/2017 | Bowman et al. |
| 9,833,252 | B2 | 12/2017 | Sepetka et al. |
| 9,833,604 | B2 | 12/2017 | Lam et al. |
| 9,833,625 | B2 | 12/2017 | Waldhauser et al. |
| 10,076,634 | B2 * | 9/2018 | Dando .................. B29C 48/92 |
| 2001/0044630 | A1 * | 11/2001 | Stack .................... A61F 2/958 |
| | | | 623/1.11 |
| 2003/0078613 | A1 | 4/2003 | Heidner |
| 2003/0212360 | A1 * | 11/2003 | Shkolnik ............. A61M 25/104 |
| | | | 604/103 |
| 2007/0016240 | A1 | 1/2007 | Warnack et al. |
| 2007/0095474 | A1 | 5/2007 | Weller et al. |
| 2008/0077173 | A1 | 3/2008 | Flanagan |
| 2008/0255507 | A1 | 10/2008 | Mushtaha |
| 2009/0112158 | A1 | 4/2009 | Velasco et al. |
| 2009/0163891 | A1 | 6/2009 | Ewing et al. |
| 2010/0268159 | A1 | 10/2010 | Engel et al. |
| 2011/0284498 | A1 | 11/2011 | Warnack |
| 2017/0007264 | A1 | 1/2017 | Cruise et al. |
| 2017/0007265 | A1 | 1/2017 | Guo et al. |
| 2017/0020670 | A1 | 1/2017 | Murray et al. |
| 2017/0020700 | A1 | 1/2017 | Bienvenu et al. |
| 2017/0027640 | A1 | 2/2017 | Kunis et al. |
| 2017/0027692 | A1 | 2/2017 | Bonhoeffer et al. |
| 2017/0027725 | A1 | 2/2017 | Argentine |
| 2017/0035436 | A1 | 2/2017 | Morita |
| 2017/0035567 | A1 | 2/2017 | Duffy |
| 2017/0042548 | A1 | 2/2017 | Lam |
| 2017/0049596 | A1 | 2/2017 | Schabert |
| 2017/0071737 | A1 | 3/2017 | Kelley |
| 2017/0072452 | A1 | 3/2017 | Monetti et al. |
| 2017/0079671 | A1 | 3/2017 | Morero et al. |
| 2017/0079680 | A1 | 3/2017 | Bowman |
| 2017/0079766 | A1 | 3/2017 | Wang et al. |
| 2017/0079767 | A1 | 3/2017 | Leon-Yip |
| 2017/0079812 | A1 | 3/2017 | Lam et al. |
| 2017/0079817 | A1 | 3/2017 | Sepetka et al. |
| 2017/0079819 | A1 | 3/2017 | Pung et al. |
| 2017/0079820 | A1 | 3/2017 | Lam et al. |
| 2017/0086851 | A1 | 3/2017 | Wallace et al. |
| 2017/0086996 | A1 | 3/2017 | Peterson et al. |
| 2017/0095259 | A1 | 4/2017 | Tompkins et al. |
| 2017/0100126 | A1 | 4/2017 | Bowman et al. |
| 2017/0100141 | A1 | 4/2017 | Morero et al. |
| 2017/0100143 | A1 | 4/2017 | Grandfield |
| 2017/0100183 | A1 | 4/2017 | Iaizzo et al. |
| 2017/0113023 | A1 | 4/2017 | Steingisser et al. |
| 2017/0147765 | A1 | 5/2017 | Mehta |
| 2017/0151032 | A1 | 6/2017 | Loisel |
| 2017/0165062 | A1 | 6/2017 | Rothstein |
| 2017/0165065 | A1 | 6/2017 | Rothstein et al. |
| 2017/0165454 | A1 | 6/2017 | Tuohy et al. |
| 2017/0172581 | A1 | 6/2017 | Bose et al. |
| 2017/0172766 | A1 | 6/2017 | Vong et al. |
| 2017/0172772 | A1 | 6/2017 | Khenansho |
| 2017/0189033 | A1 | 7/2017 | Sepetka et al. |
| 2017/0189035 | A1 | 7/2017 | Porter |
| 2017/0215902 | A1 | 8/2017 | Leynov et al. |
| 2017/0216484 | A1 | 8/2017 | Cruise et al. |
| 2017/0224350 | A1 | 8/2017 | Shimizu et al. |
| 2017/0224355 | A1 | 8/2017 | Bowman et al. |
| 2017/0224467 | A1 | 8/2017 | Piccagli et al. |
| 2017/0224511 | A1 | 8/2017 | Dwork et al. |
| 2017/0224953 | A1 | 8/2017 | Tran et al. |
| 2017/0231749 | A1 | 8/2017 | Perkins et al. |
| 2017/0232239 | A1 | 8/2017 | Allen et al. |
| 2017/0252064 | A1 | 9/2017 | Staunton |
| 2017/0265983 | A1 | 9/2017 | Lam et al. |
| 2017/0281192 | A1 | 10/2017 | Tieu et al. |
| 2017/0281331 | A1 | 10/2017 | Perkins et al. |
| 2017/0281344 | A1 | 10/2017 | Costello |
| 2017/0281909 | A1 | 10/2017 | Northrop et al. |
| 2017/0281912 | A1 | 10/2017 | Melder et al. |
| 2017/0290593 | A1 | 10/2017 | Cruise et al. |
| 2017/0290654 | A1 | 10/2017 | Sethna |
| 2017/0296324 | A1 | 10/2017 | Argentine |
| 2017/0296325 | A1 | 10/2017 | Marrocco et al. |
| 2017/0303939 | A1 | 10/2017 | Greenhalgh et al. |
| 2017/0303942 | A1 | 10/2017 | Greenhalgh et al. |
| 2017/0303947 | A1 | 10/2017 | Greenhalgh et al. |
| 2017/0303948 | A1 | 10/2017 | Wallace et al. |
| 2017/0304041 | A1 | 10/2017 | Argentine |
| 2017/0304097 | A1 | 10/2017 | Corwin et al. |
| 2017/0304595 | A1 | 10/2017 | Nagasrinivasa et al. |
| 2017/0312109 | A1 | 11/2017 | Le |
| 2017/0312484 | A1 | 11/2017 | Shipley et al. |
| 2017/0316561 | A1 | 11/2017 | Helm et al. |
| 2017/0319826 | A1 | 11/2017 | Bowman et al. |
| 2017/0333228 | A1 | 11/2017 | Orth et al. |
| 2017/0333236 | A1 | 11/2017 | Greenan |
| 2017/0333678 | A1 | 11/2017 | Bowman et al. |
| 2017/0340383 | A1 | 11/2017 | Bloom et al. |
| 2017/0348014 | A1 | 12/2017 | Wallace et al. |
| 2017/0348514 | A1 | 12/2017 | Guyon et al. |
| 2018/0117287 | A1 | 5/2018 | Krautkremer et al. |
| 2021/0154443 | A1 | 5/2021 | Casey |

OTHER PUBLICATIONS

EP search report dated Jan. 21, 2022 for counterpart EP 21 18 8147 (18 pp.) of U.S. Appl. No. 16/942,699, filed Jul. 29, 2020.
Chinese office action dated Apr. 16, 2025, in corresponding application 202110862131.0, and submitted with English Translation.

(56) References Cited

OTHER PUBLICATIONS

Japanese office action dated May 20, 2025, in corresponding application 2021-123100, and submitted with English Translation.

* cited by examiner

ENHANCED BALLOON BONDING FOR BALLOON GUIDE CATHETERS WHILE MINIMIZING OUTER PROFILES

BACKGROUND OF THE INVENTION

Field of the Invention

During capture and retrieval of a thrombus, occlusion, or clot in a vessel using an intravascular catheter a with a balloon may be employed to arrest blood flow or dilate the vessel. The balloon is secured to the catheter shaft of the present inventive balloon guide catheter at a bonding interface area(s) having a minimized outer profile/diameter and optimized bond strength.

Description of Related Art

Acute ischemic stroke is primarily caused by a thrombotic or embolic occlusion (e.g., blockage) in an artery of the brain. The occlusion is typically caused by a blood clot liberated from another part of the body which travels in an antegrade direction (in the direction of normal blood flow) through the vessel and eventually becomes lodged in a neurovascular artery, where it obstructs blood flow to a region of the brain.

A procedure known as a thrombectomy may be used to remove the thrombus, occlusion, blockage or clot lodged in the vessel using a mechanical retrieval device. During the thrombectomy procedure or treatment a physician or interventionalist endovascularly introduces a guidewire and microcatheter together through the vasculature, typically in an artery located in the groin or the arm or by direct access through the carotid artery. Together the guidewire and microcatheter are advanced to a location facing a proximal side of the targeted clot, blockage or occlusion. Then the guidewire is advanced across the clot, followed by the microcatheter. While in a compressed state, a mechanical thrombectomy device may be guided through the lumen of the microcatheter to the target site. Upon emerging from the microcatheter the mechanical thrombectomy device typically automatically expands to its original enlarged state. Mechanical thrombectomy devices are typically made of a self-expanding biocompatible material such as nickel-titanium. Aspiration through the catheter may accompany or be used in place of the mechanical retrieval device to remove the clot.

During a thrombectomy procedure balloon guide catheters are often employed to arrest blood flow by introducing an inflation fluid into a compliant inflatable balloon (rather than inflating via pressure) made of an elastomeric material, for example, polyurethane, polyblend, or latex. Its ability to conform to the shape of the vasculature makes the compliant inflatable balloon particularly suited for use in arresting of blood flow. In other applications such as dilating of a vessel or opening an occlusion, balloon guide catheters may employ a non-compliant or semi-compliant balloon that is inflated by pressure, rather than using an inflation fluid. Specifically, non-compliant balloons typically made of polyester or nylon when inflated at a high pressure dilate a vessel or open an occlusion; whereas semi-compliant balloons made of material such as Pebax or higher durometer polyurethanes when inflated in pressure are more compliant than that of non-compliant balloons providing greater flexibility during delivery. Regardless of the type of balloon (compliant, semi-compliant, or non-compliant), bonding of the balloon to the exterior surface of the catheter shaft during manufacture has two competing criteria, i.e., minimization of the outer profile/diameter at the bonding interface area(s) in which the balloon is mounted to the catheter shaft while maximizing bond strength and integrity.

It is desirable to design an improved balloon guide catheter having a bonding interface area between the balloon and exterior surface of the catheter shaft to achieve optimum bond strength and integrity while minimizing outer profile or outer diameter.

SUMMARY OF THE INVENTION

An aspect of the present invention is directed to an improved balloon guide catheter to which a balloon (compliant, semi-compliant, or non-compliant) is bonded thereto with maximized bonding strength and integrity while minimizing outer profile or outer diameter.

Another aspect of the present invention relates to a balloon guide catheter with a catheter shaft having defined longitudinally therein a central lumen and an inflation lumen substantially parallel to the central lumen; the catheter shaft having a braid supporting the central lumen and the inflation lumen. A balloon is disposed about the braid. At least one reflow jacket made of a material reflowable into the braid secures the balloon to the catheter shaft, wherein an exposed portion of the balloon is not covered by the at least one reflow jacket.

Still another aspect of the present invention is directed to a balloon guide catheter including a catheter shaft and a balloon disposed about the catheter shaft. The balloon is secured to the catheter shaft at a distal bond interface area and an opposite proximal bond interface area, wherein the balloon has a plurality of radially arranged apertures and/or recesses defined in each of the distal and proximal bond interface areas of the balloon. Adhesive disposed about the exterior surface of the catheter shaft is seepable upwards into the plural radially arranged apertures and/or recesses in the balloon.

While still another aspect of the present invention relates to a balloon guide catheter including a catheter shaft having an exterior surface and a balloon disposed about the exterior surface of the catheter shaft. The balloon has an inverted distal bonding interface area including an inverted distal edge and/or an opposite inverted proximal bonding interface area including a proximal edge. The inverted distal bonding interface area and/or the inverted proximal bonding interface area of the balloon is secured via an adhesive to the exterior surface of the catheter shaft.

Yet another aspect of the present invention is directed to a balloon guide catheter including a catheter shaft and a balloon sleeve disposed about the catheter shaft. The balloon is secured to the catheter shaft at a skived distal bond interface area and/or an opposite skived proximal bond interface area. The skived distal bond interface area and/or the skived proximal bond interface area of the balloon is secured to the catheter shaft via an adhesive.

Another aspect of the present invention is directed to a balloon guide catheter including a catheter shaft having an exterior surface and a balloon disposed about the catheter shaft. The balloon is secured to the catheter shaft, with a vent tube secured between the compliant inflatable tube and the exterior surface of the catheter shaft.

A further aspect of the present invention relates to a balloon guide catheter including a catheter shaft and a balloon disposed about the catheter shaft. The balloon is secured to the catheter shaft at a distal bond interface area and an opposite proximal bond interface area; wherein the balloon has an exhaust hole defined therein between the proximal and distal bond interface areas. The balloon is transitionable to an expanded state with a portion of the balloon extendible over at least one of the respective proximal and distal bond interface areas in physical contact with an exterior surface of the catheter shaft sealing the exhaust hole.

BRIEF DESCRIPTION OF THE DRAWING

The foregoing and other features of the present invention will be more readily apparent from the following detailed description and drawings illustrative of the invention wherein like reference numbers refer to similar elements throughout the several views and in which.

DETAILED DESCRIPTION OF THE INVENTION

The terms "distal" or "proximal" are used in the following description with respect to a position or direction relative to the treating physician or medical interventionalist. "Distal" or "distally" are a position distant from or in a direction away from the physician or interventionalist. "Proximal" or "proximally" or "proximate" are a position near or in a direction toward the physician or medical interventionalist. The terms "occlusion", "clot" or "blockage" are used interchangeably.

The present invention is directed to several different features, designs and configurations for an intravascular catheter with a balloon for arresting blood flow through or dilating a vessel, wherein the integrity and strength of the bond between the balloon secured to the catheter shaft is optimized while the outer profile/diameter is minimized. By way of illustrative example, the present inventive balloon guide catheter is shown and described with a compliant inflatable balloon. It is, however, within the intended scope of the present invention for the present inventive balloon guide catheter to employ any type of balloon (compliant, semi-compliant, or non-compliant).

Figure 1A:
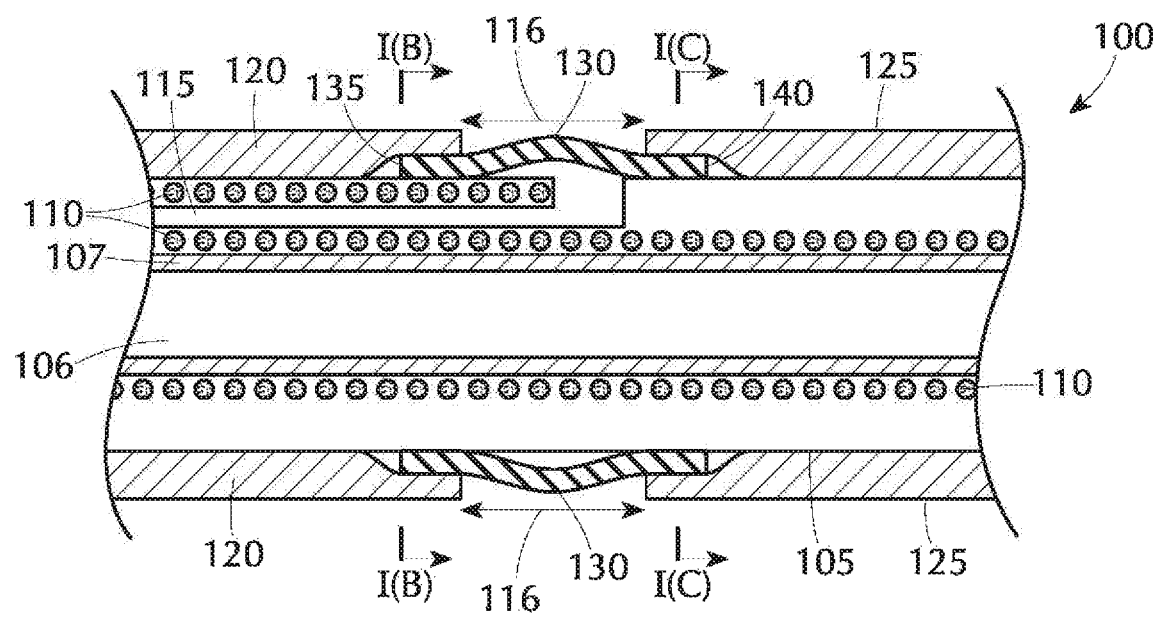
FIG. 1A is a partial axial cross-sectional view of a first configuration of the present inventive balloon guide catheter in which distal and proximal edges of a compliant inflatable balloon sleeve (depicted in a non-inflated state) are secured beneath respective distal and proximal reflow jackets/sleeves separated axially from one another to form a 360° radial gap therebetween exposing a portion of the compliant inflatable balloon sleeve.
Figure 1B:
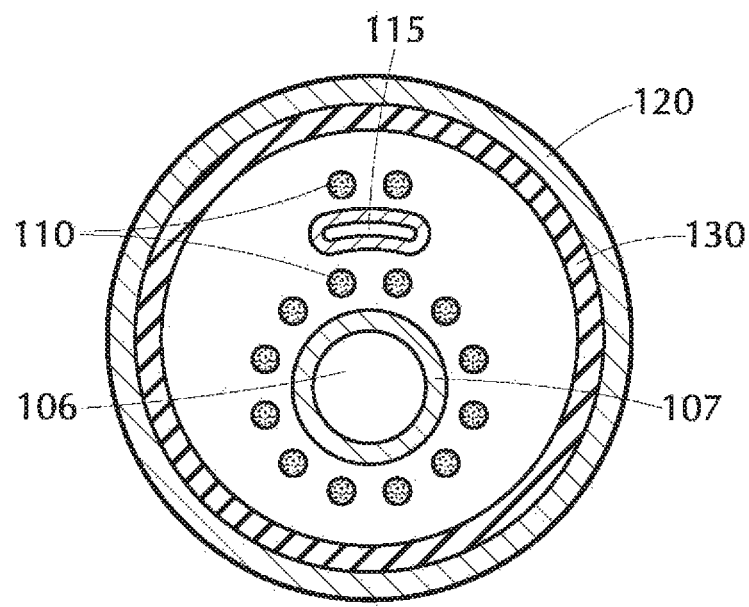
FIG. 1B is a radial cross-sectional view along lines I(B)-I(B) in FIG. 1A through the proximal reflow jacket/sleeve securing the proximal edge of the of the compliant inflatable balloon sleeve to the exterior surface of the catheter shaft.
Figure 1C:
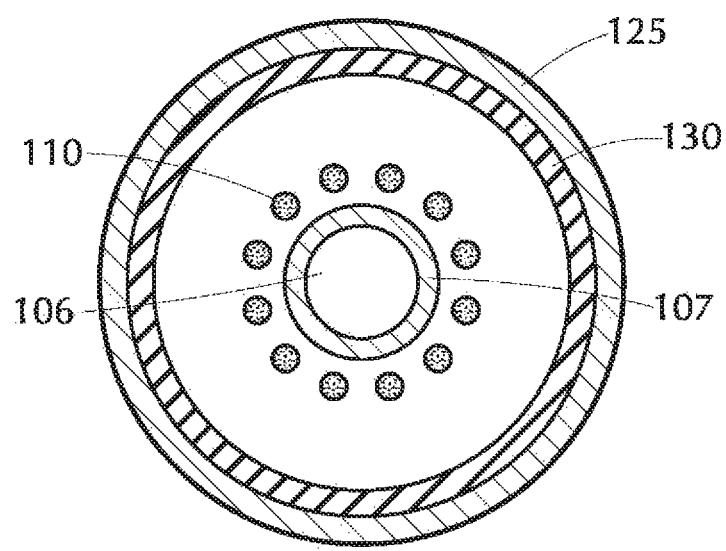
FIG. 1C is a radial cross-sectional view along lines I(C)-I(C) in FIG. 1A through the distal reflow jacket/sleeve securing the distal edge of the of the compliant inflatable balloon sleeve to the exterior surface of the catheter shaft.

The compliant inflatable balloon may be a sleeve or patch secured or trapped to the exterior surface of the catheter shaft beneath one or more reflow jackets or sleeves. FIGS. 1A-1C represent a first design of the present inventive balloon guide catheter in which opposite edges of a compliant inflatable balloon sleeve 130 are secured or trapped to an exterior surface of a catheter shaft 105 by separate respective reflow jackets/sleeves 120, 125. A partial longitudinal cross-sectional view of the balloon guide catheter 100 in accordance with this first configuration is shown in FIG. 1A. A catheter shaft 105 includes an inner liner or lining 107 forming an axially extending central lumen 106. Arranged radially outward and encompassing the inner liner or lining 107 is a supporting layer 110 (e.g., braid, mesh, cage or hypotube) providing support and kink resistance to the central lumen 106 and inflation lumen 115 extending substantially parallel thereto. In the example illustrated in the figures, the supporting layer is a braid 110. Preferably, braid 110 encircles the central lumen 106 as well as being woven above and below the inflation lumen 115 in a figure "8" configuration, as shown in the radial cross-sectional view of FIG. 1B. Braid 110 encircles the entire length of the central lumen 106 (FIG. 1C). A compliant inflatable balloon sleeve 130 having a proximal edge 135 arranged proximally of and opposite that of a distal edge 140 is disposed about the braid 110 of the catheter shaft 105.

Two reflow jackets or sleeves are disposed about the catheter shaft. Specifically, a distal reflow jacket/sleeve 125 is arranged distally of and separated a predetermined distance in an axial direction from a proximal reflow jacket/sleeve 120 defining a 360° radial gap 116 therebetween. The proximal and distal reflow jackets/sleeves 120, 125 being positioned so that they cover the respective proximal and distal edges 135, 140 of the compliant inflatable balloon sleeve 130 while a central radial portion of the compliant inflatable balloon sleeve 130 remains exposed through the 360° radial gap 116. In the exemplary embodiment depicted in FIG. 1A, a single proximal reflow jacket/sleeve 120 is disposed radially outward of so as to cover the proximal edge 135 of the compliant inflatable balloon sleeve 130, while a single distal reflow jacket/sleeve 125 is disposed radially outward of so as to cover the distal edge 140 of the compliant inflatable balloon sleeve 130. Multiple proximal reflow jackets/sleeves may be arranged a top one another in a radially outward direction covering the proximal edge 135 of the compliant inflatable balloon sleeve 130 and reflowed onto (embedded within) the braid 110, while multiple distal reflow jackets/sleeves may be arranged a top one another in a radially outward direction covering the distal edge 140 of the compliant inflatable balloon sleeve 130 and reflowed onto (embedded within) the braid 110. In such circumstance of multiple reflow jackets/sleeves covering each of the proximal and distal edges of the compliant inflatable balloon, each reflow jacket/sleeve may be independently reflowed with each reflow jacket/sleeve positioned and heated sequentially one a top the other. That is, the first or inner reflow jackets/sleeves (proximal and distal) after being positioned about the respective proximal and distal edges of the compliant inflatable balloon is heated to reflow onto (embed within) the braid 110. Thereafter, the second or outer reflow jackets/sleeves (proximal and distal) after being positioned about the corresponding first reflow jackets/sleeves is heated to reflow onto. Otherwise, a single reflow process may be employed whereby both the first (inner) and second (outer) reflow jackets/sleeves once positioned are simultaneously subjected to heat at the same time causing the material to reflow.

During assembly, the compliant inflatable balloon sleeve 130 is positioned about the catheter shaft 105. Thereafter, proximal and distal reflow jackets/sleeves 120, 125 are positioned over the compliant inflatable balloon sleeve 130 so as to cover the respective proximal and distal edges 135, 140 while a central 360° radial portion of the compliant inflatable balloon sleeve 130 remains exposed through the 360° radial gap 116. During reflow, a protective covering (e.g., band) is positioned at least covering the 360° radial gap 116 to protect the exposed portion of the compliant inflatable balloon sleeve 130 (i.e., that portion of the compliant inflatable balloon sleeve not covered by a reflow jacket/sleeve) from exposure to heat during the reflow process. Preferably, the protective covering extends beyond the balloon, for example, a protective covering sleeve extending in an axial direction beyond the proximal and distal edges on both sides of the compliant inflatable balloon. The protective covering is preferably a heat resistant material such as heat shrink material (e.g., Polyethylene terephthalate (PET), Fluorinated ethylene propylene (FEP)) the nature of which ensures that it is remains in place. A non-heat shrinkable material (e.g., Polytetrafluoroethylene (PTFE), Polyether ether ketone (PEEK)) may be used as the protective covering which is secured in place, for example, via an outer band or sleeve made of heat shrinkable material. The assembled catheter shaft is then subject to heat using thermal and/or laser light causing the proximal and distal reflow jackets/sleeves 120, 125 to reflow melt along with the respective proximal and distal edges 135, 140 of the compliant inflatable balloon 130 creating a leakproof seal with the braid 110 of the catheter shaft 105. After reflow, the protective covering is removed. Injection of a biocompatible inflation fluid (e.g., contrast saline solution) via the inflation lumen 115 causes the compliant inflatable balloon to expand only within the 360° radial gap 116. Hence, a 360° radial inflated bulge (e.g., tire) of the compliant inflatable balloon is produced in the 360° radial gap 116 between the proximal and distal reflow jackets/sleeves 120, 125.

Figure 2A:
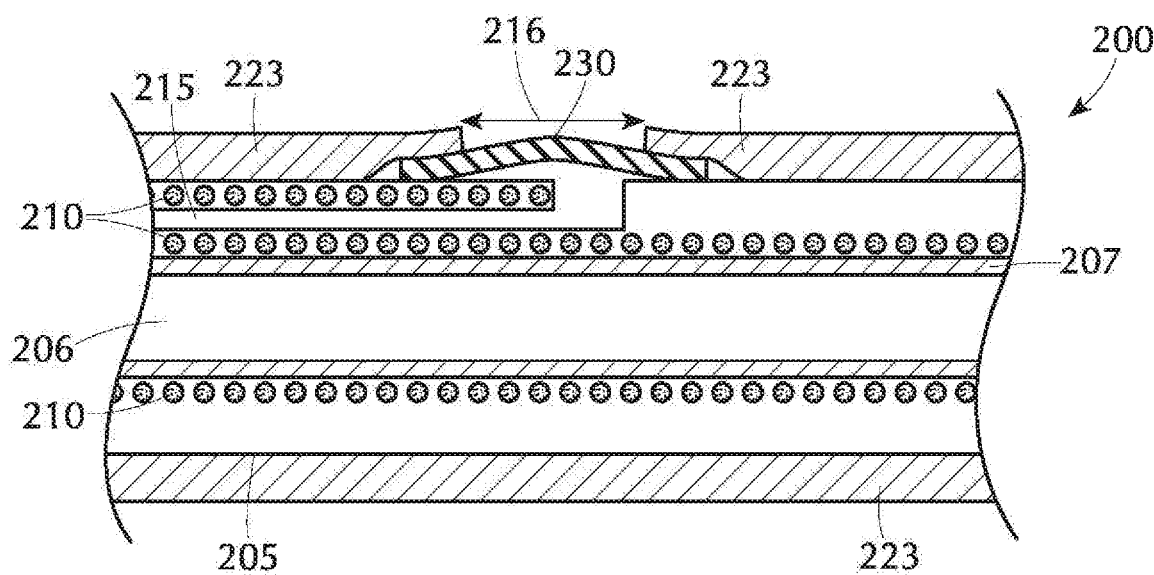
FIG. 2A a partial axial cross-sectional view of another configuration of the present inventive balloon guide catheter in which a compliant inflatable balloon (depicted in a non-inflated state) is secured beneath a single reflow jacket/sleeve having a cut-out or opening defined therein exposing a portion of the compliant inflatable balloon.
Figure 2B:
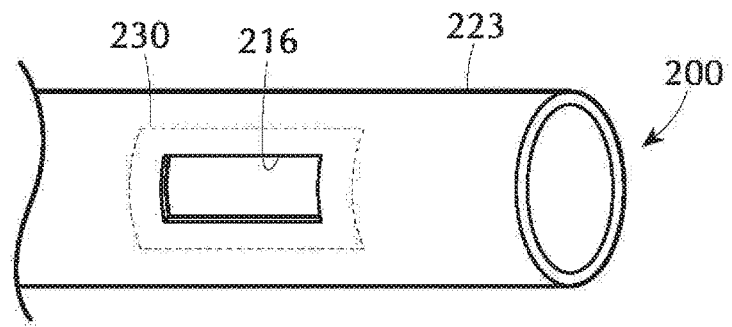
FIG. 2B is a top view of the balloon guide catheter of FIG. 2A, wherein the compliant inflatable balloon is in a non-inflated state.
Figure 2C:
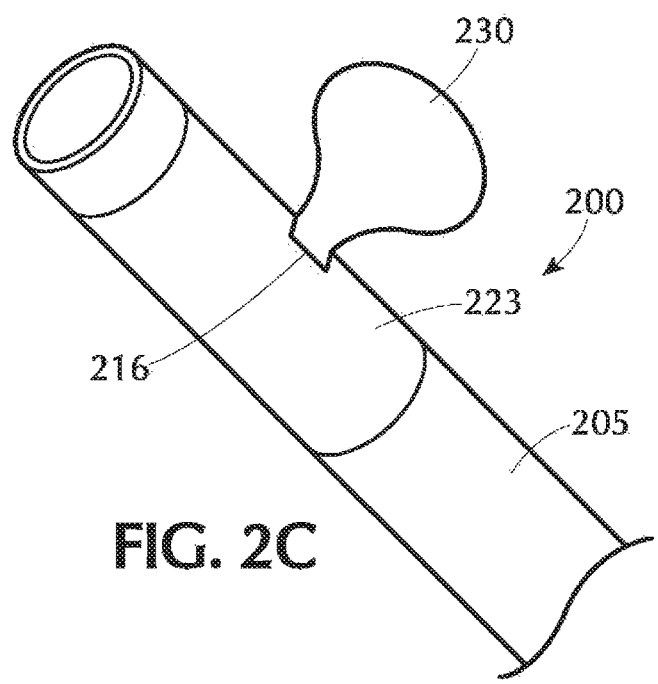
FIG. 2C is a distal perspective view of the balloon guide catheter of FIG. 2B, wherein the compliant inflatable balloon is in an inflated state, protruding radially outward through the cut-out or opening defined in the single reflow jacket/sleeve.

FIGS. 2A-2C depict a slight variation from the previously described configuration of the present inventive balloon guide catheter illustrated in FIGS. 1A-1C. Rather than two (e.g., proximal and distal) reflow jackets/sleeves separated axially to define a 360° radial gap, a single reflow jacket/sleeve 223 is employed having a cut-out or opening 216 defined therein that extends radially less than 360° (e.g., side opening). A partial longitudinal cross-sectional view of the balloon guide catheter 200 in accordance with this modified configuration is shown in FIG. 2A. A catheter shaft 205 includes an inner liner or lining 207 forming an axially extending central lumen 206. Arranged radially outward and encompassing the inner liner or lining 207 is a supporting layer 210 (e.g., braid, mesh, cage or hypotube) supporting both the central lumen 206 and inflation lumen 215 arranged substantially parallel to one another. In the example illustrated in the figures, the supporting layer is a braid 210 similar in configuration to that in FIGS. 1A-1C. A compliant inflatable balloon patch 230 having a perimeter is placed over the braid 210 of the catheter shaft 205. A single reflow jacket or sleeve 223 has defined therein a cut-out or opening 216 extending less than 360° radially that is substantially aligned with the compliant inflatable balloon patch 230. The cut-out or opening 216 is sized to be smaller in dimension than the perimeter of the compliant inflatable balloon patch 230 exposing only a portion of the balloon patch therethrough. A rectangular shape cut-out or opening 216 is illustrated, but any desired shape may be used such as, but not limited to, a square, a circle, or an oval. FIG. 2B is a top view of the assembled balloon guide catheter 200 depicting the cut-out or opening 216 in the single reflow jacket/sleeve 223 exposing a portion of the compliant inflatable balloon 230 (shown in a non-inflated state—the outer perimeter of which is denoted by dashed lines). Injection of the biocompatible inflation fluid (e.g., contrast saline solution) via the inflation lumen 215 causes the secured compliant inflatable balloon 230 to expand only within the cut-out or opening 216. Hence, an inflated "side" bulge (i.e., "side inflation bulge" extending radially less than 360°) of the compliant inflatable balloon is produced in the cut out or opening 216 of the reflow jacket/sleeve 223. Once the catheter is inserted in a vessel at a target site the balloon is inflated producing an offset inflated ("side bulge") arresting blood flow therethrough with minimal increase to the outer profile or outer diameter of the assembled catheter.

In the reflow jacket/sleeve configurations illustrated and described above in FIGS. 1A-1C as well as FIGS. 2A-2C, each of the central lumen and inflation lumen is supported by the braid 210 (e.g., supporting layer) extending to their respective distal ends. Referring to FIG. 1A, braid 110 supports (i.e., woven above and below) the inflation lumen 115 to its distal end (e.g., discharge port) coinciding with the 360° radial gap 116 between the two separated distal and proximal reflow jackets/sleeves 120, 125. Similarly, in FIG. 2A, braid 210 supports (i.e., woven above and below) the inflation lumen 215 to its distal end (e.g., discharge port) coinciding with the cut-out or opening 216 defined in the single reflow jacket/sleeve 223. In either design, such support provided by the braid extending to the distal end of the inflation lumen undesirably increases the overall outer profile (outer diameter) at the proximal interface bond area of the compliant inflatable balloon secured to the reflow jacket/sleeve.

Figure 3:
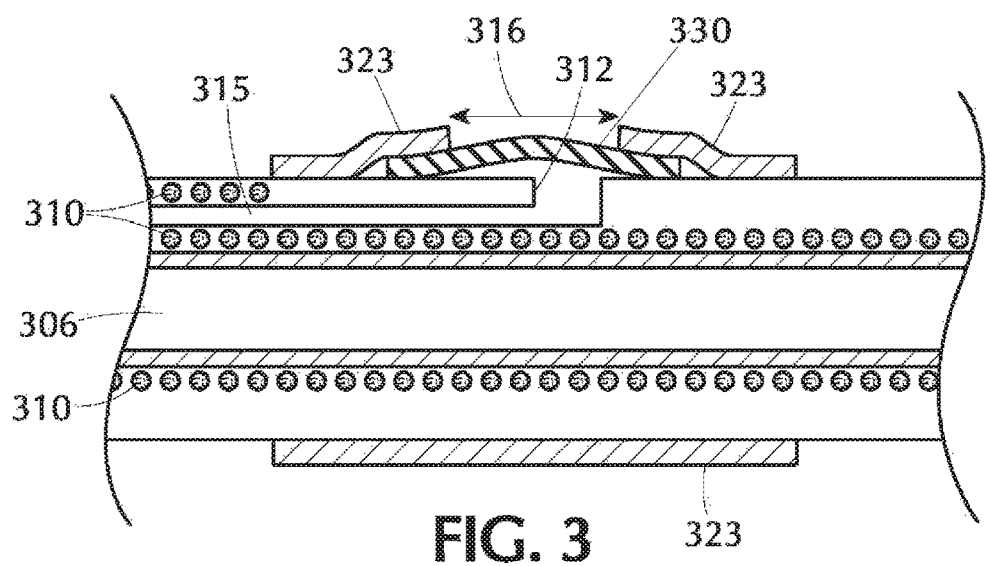
FIG. 3 is a partial longitudinal cross-sectional view of still another configuration of the present inventive balloon guide catheter in which a braid configured as a figure "8" (woven above and below the inflation lumen as well as encompassing the central lumen) terminates proximally of the distal end of the inflation lumen so as not to coincide with the single reflow jacket/sleeve thereby minimizing the outer profile.

Referring to the exemplary partial longitudinal cross-sectional view in FIG. 3, the supporting layer (e.g., a braid 310) once again is arranged in the shape of a figure "8" (i.e., wound about the central lumen 306 as well as above and below the inflation lumen 315). In order to reduce the overall profile by the radial thickness of the braid, in FIG. 3 a portion of the distal end of the inflation lumen 315 starting from the discharge port 312 (distal tip or end) and extending in a proximal direction to a proximal edge of the single reflow sleeve/jacket 323 is free from (not supported by) the braid 310 (e.g., supporting layer). That is, the shortening in a distal direction of the "over" braid 310 (i.e., braid woven above and below the inflation lumen) so that it does not coincide (i.e., stops prior to or upon reaching) with the single reflow jacket/sleeve 323. Note that the embodiment illustrated is that of a single reflow 323 jacket/sleeve having a cut-out or opening 316 defined therein; however, this feature of the inflation lumen being unsupported where it coincides with the reflow jacket/sleeve is also suited to the design employing two reflow jackets/sleeves separated from one another to form a 360° radial gap therebetween (as depicted in FIGS. 1A-1C). Accordingly, in either design (e.g., the single reflow jacket/sleeve having a single side opening or two reflow jackets/sleeves separated axial to form a 360° radial gap therebetween), in the area that coincides with the reflow jacket/sleeve, the inflation lumen 315 is not supported by the braid 310 (i.e., braid 310 is not woven above and below the inflation lumen) thereby minimizing the overall outer profile (outer diameter) of the assembled balloon guide catheter. Unlike the inflation lumen 315, central lumen 306 is preferably supported from the proximal to the distal end by the braid 310.

Figure 4A:
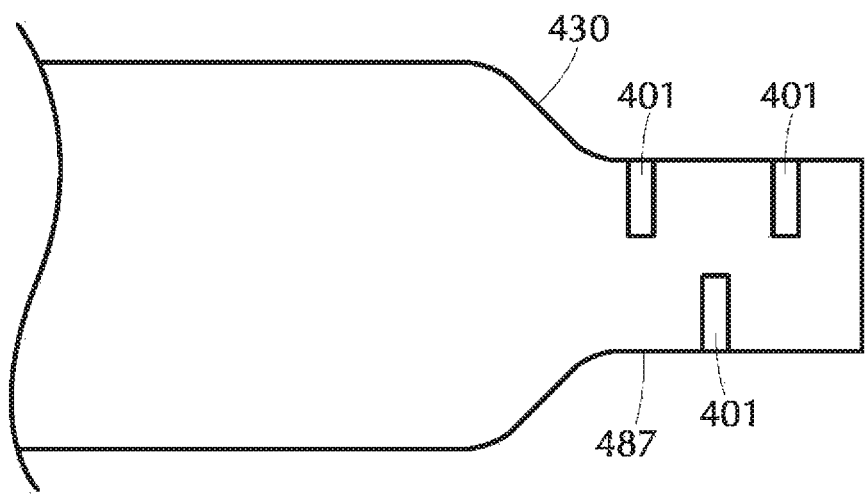
FIG. 4A is a partial side view of a proximal bond interface area of a complaint inflatable balloon having a plurality of radial slits defined therein, wherein the balloon is illustrated in an inflated state.
Figure 4B:
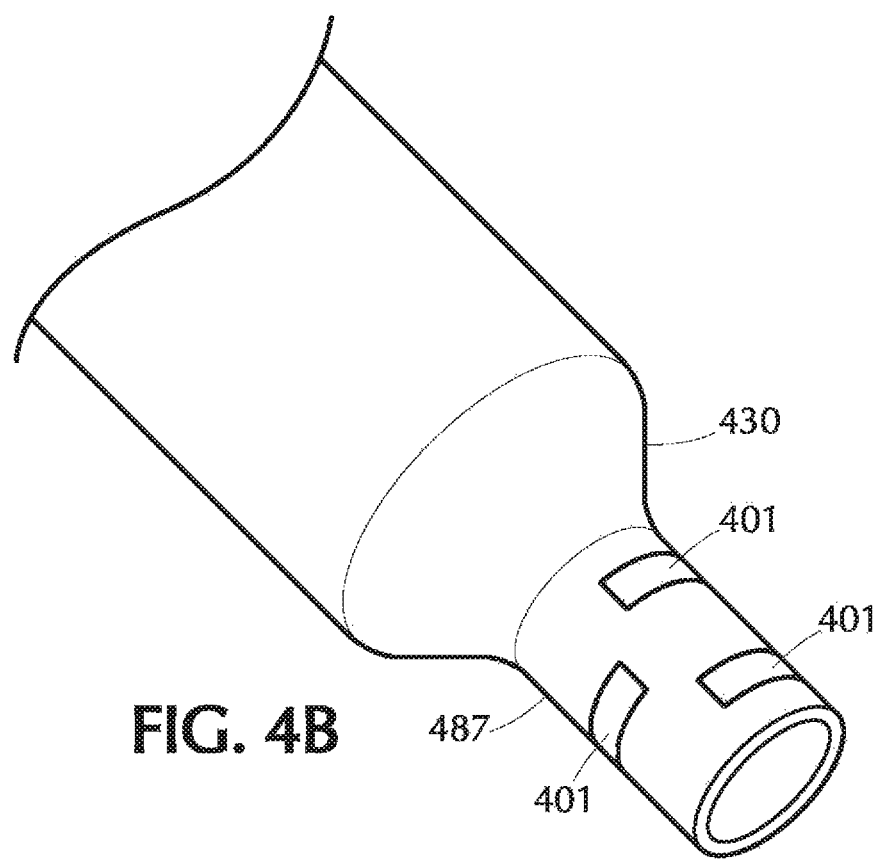
FIG. 4B is a partial proximal end perspective view of the compliant inflatable balloon of FIG. 4A.
Figure 4C:
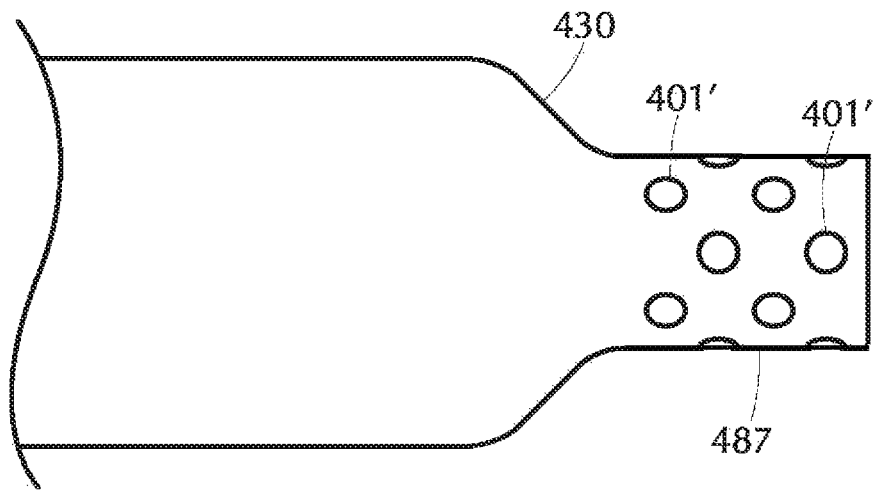
FIG. 4C is a partial side view of a proximal bond interface area of a complaint inflatable balloon having a plurality of radially arranged holes defined therein, wherein the balloon is illustrated in an inflated state.

Improved wettability and bond strength may be attained by defining a plurality of apertures (radial slits, holes or other geometric shapes) and/or recesses (indents) arranged radially in each of the proximal and distal bond interface areas of the compliant inflatable balloon secured to the exterior surface of the catheter shaft. FIGS. 4A & 4B are respective side and perspective views of the proximal end of the compliant inflatable balloon sleeve (shown in an inflated state) having a plurality of apertures (e.g., radial slits 401) defined therethrough in the proximal bond interface area 487 (the distal bond interface area having similar plural apertures defined therein). The shape of each aperture may be a radial slit 401 (as shown in FIGS. 4A & 4B), a circular hole 401' (FIG. 4C) or any other geometric shape defined through the balloon. All of the plural apertures may have the same shape and size, but different shapes and/or variation in size is also possible. Any number of one or more rows of radially arranged apertures may be provided wherein adjacent rows may be either offset or aligned radially from one another.

Figure 4D:
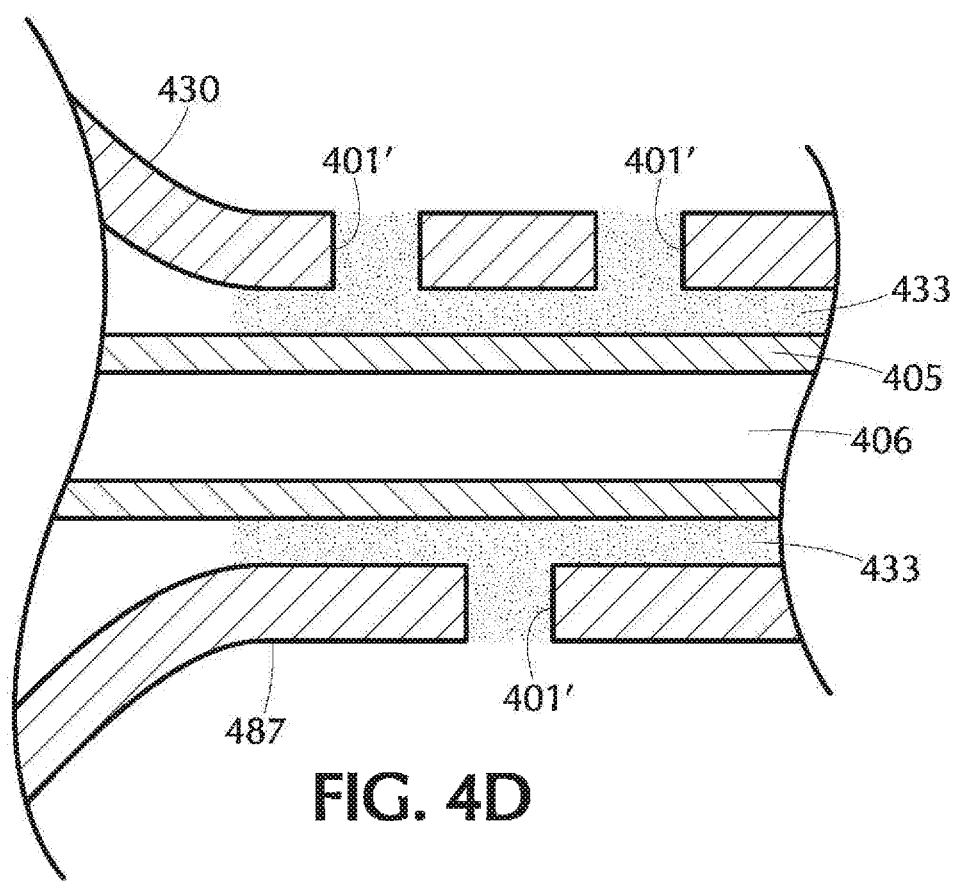
FIG. 4D is a longitudinal cross-sectional view of the compliant inflatable balloon of FIG. 4A assembled to a catheter shaft.

Prior to assembly, the plurality of apertures is made in the respective proximal and distal bond interface areas of the compliant inflatable balloon sleeve 430 using drilling, burning, laser etching, etc. Thereafter, while in a non-inflated state, the compliant inflatable balloon 430 sleeve is positioned about the exterior surface of the catheter shaft 405. Respective proximal and distal edges of the compliant inflatable balloon 430 are rolled toward one another exposing the exterior surface of the catheter shaft 405 beneath. Biocompatible adhesive 433 is applied about the exposed exterior surface of the catheter shaft 405, whereupon the proximal and distal edges of the compliant inflatable balloon 430 are unfurled over the applied biocompatible adhesive 433 seeping or oozing upwards through the apertures 401 defined through the compliant inflatable balloon 430, as shown in longitudinal cross-sectional view in FIG. 4D. It is also possible that the adhesive 433 may ooze or seep beyond the radial thickness of the apertures and onto the exterior surface of the compliant inflatable balloon sleeve 430 in areas adjacent to the apertures. In the configuration depicted in FIGS. 4A-4C a plurality of apertures (e.g., radial slits or circular holes) is defined through the compliant inflatable balloon (extending from the interior surface to the outer surface of the balloon). Alternatively, the compliant inflatable balloon may be designed to have a plurality of recesses (indents) defined along the interior surface of the compliant inflatable balloon (without extending through to (closed off at) the exterior surface of the compliant inflatable balloon). Recesses may be sufficient to allow the adhesive to pool therein, but since they are closed off at the exterior surface of the compliant inflatable balloon prevent the adhesive from flowing on to the exterior surface. In yet another possible configuration, a combination of apertures and recesses may be defined in the compliant inflatable balloon. The apertures and/or recesses may extend a predetermined length in a longitudinal direction to constrain/limit/control the bond length/size by virtue of the fact that the adhesive flows/pools into them. Thus, during manufacture pooling of the adhesive only within the apertures and/or recesses allows the bond length to be controlled without increasing the bond outer profile.

Figure 5A:
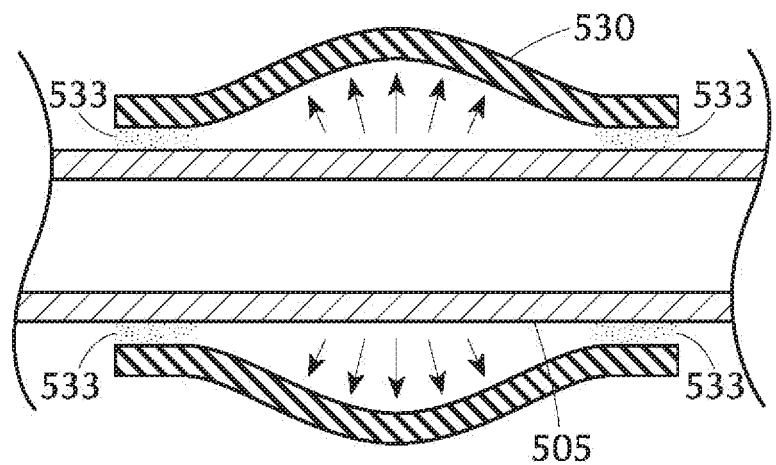
FIG. 5A is a partial longitudinal cross-sectional view of a prior art balloon guide catheter having a compliant inflatable balloon sleeve secured along non-inverted proximal and non-inverted distal bond interface areas thereof to the exterior surface of the catheter shaft using an adhesive.
Figure 5B:
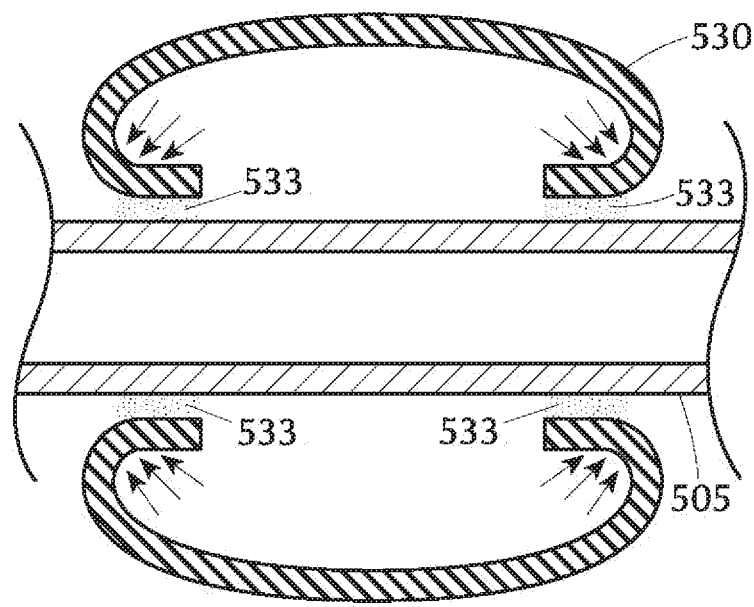
FIG. 5B is a partial longitudinal cross-sectional view of a present inventive balloon guide catheter having a compliant inflatable balloon sleeve secured along an inverted proximal bond interface area and an inverted distal bond interface area to the exterior surface of the catheter shaft using an adhesive.
Figure 5C:
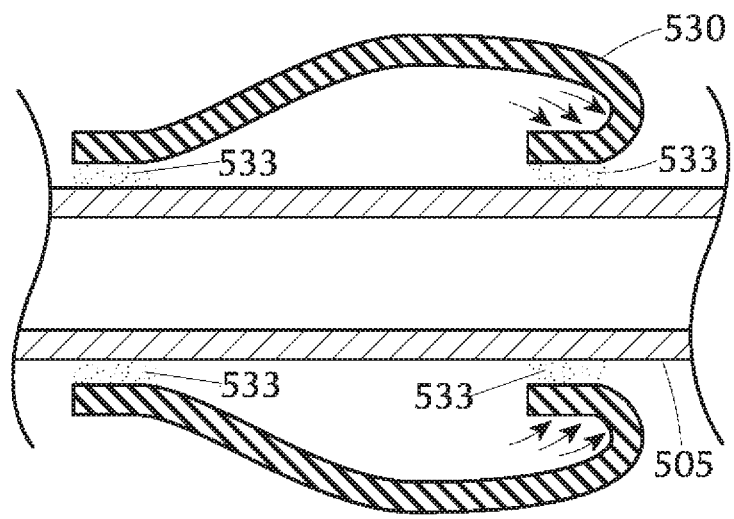
FIG. 5C is a partial longitudinal cross-sectional view of a present inventive balloon guide catheter having a compliant inflatable balloon sleeve secured along a non-inverted proximal bond interface area and an inverted distal bond interface area to the exterior surface of the catheter shaft using an adhesive.

Another aspect of the present inventive balloon guide catheter is to maintain integrity and maximize strength of the bond created between the compliant inflatable balloon and the exterior surface of the catheter shaft. Diminished bond integrity possibly resulting in failure due to peel back of the secured proximal and/or distal edges of the compliant inflatable balloon sleeve when inflated is problematic. FIG. 5A shows a prior art conventional non-inverted adhesive bond of a compliant inflatable balloon sleeve to an exterior surface of the catheter shaft. When over inflated a compliant balloon may grow or expand over the conventional non-inverted bonds resulting in possible unwanted peel back along such bonds. To minimize the occurrence of peel back during inflation, the present inventive compliant inflatable balloon sleeve is preferably adhered to the exterior surface of the catheter shaft via an inverted bond along the proximal edge, distal edge or both edges. As a result of the inverted bond, any growth of the compliant inflatable balloon as a result of over inflation will prevent peel back. FIG. 5B is an exemplary configuration of a compliant inflatable balloon sleeve 530 in which both the proximal and distal edges thereof are inverted (e.g., retracted, flipped, folded, or bent inward) prior to being secured to the exterior surface of the catheter shaft 505 via a biocompatible adhesive 533. Whereas, FIG. 5C is an alternative configuration wherein only a single edge (e.g., the distal bond or the proximal bond) of the compliant inflatable balloon sleeve 530 is inverted (e.g., flipped, folded inward) prior to being secured to the exterior surface of the catheter shaft 505 via adhesive 533. In both configurations (FIGS. 5B & 5C), during assembly initially positioned about the exterior surface of the catheter shaft the compliant inflatable balloon sleeve 530 has an interior/inner surface (facing radially inwards towards the catheter shaft) and an exterior/outer surface (facing radially outwards away from the catheter shaft). Next, a proximal portion (including the proximal edge) and/or a distal portion (including the distal edge) of the compliant inflatable balloon sleeve 530 is inverted, flipped, folded, tucked, bent, or retracted inwards onto itself, whereupon the inverted, flipped folded, tucked or retracted inwards portion (now facing radially inward towards the catheter shaft) is adhered to the exterior surface of the catheter shaft forming an inverted bond. The two opposing inverted portions of the compliant inflatable balloon sleeve are referred to as a proximal inverted bond interface area and a distal inverted bond interface area, each of which is secured via adhesive to the exterior surface of the catheter shaft forming an inverted proximal bond and an inverted distal bond, respectively. Preferably, the inverted proximal bond interface area of the compliant inflatable balloon includes the proximal edge and is approximately 1 mm in length in an axial direction, whereas the inverted distal bond interface area of the compliant inflatable balloon includes the distal edge and is approximately 1 mm in length in an axial direction. Any desired length in an axial direction of each inverted bond interface area (proximal or distal) may be selected depending on a desired outer profile or outer diameter of the assembled catheter. That is, the shorter the axial length of the inverted bond interface area (proximal or distal) the greater the outer profile or outer diameter. The length in an axial direction of each inverted bond interface area (proximal or distal) may, but need not necessarily be, the same. Purging of residual air from the balloon may be accomplished in different ways. One method is to have a vent or exhaust hole in the balloon proximate the inverted bond, whereupon the balloon as it inflates expands outward over the vent hole forming a seal. Other prepping steps for purging residual air may be employed such as repeatedly inflating/deflating the balloon (typically while holding the catheter so that the balloon is pointing downwards and sometimes flicking of the balloon) until sufficient residual air is exhausted.

As depicted by the downward arrows illustrated in FIGS. 5B & 5C, over inflation causes the compliant inflatable balloon sleeve to grow as the pressure therein increases imposing a downward force on the inverted bond interface area (distal and/or proximal) pushing the inverted portions of the balloon against the exterior surface of the catheter shaft thereby minimizing peel back. Such inverted bond configuration enhances the integrity of the bond with negligible increase in outer profile or outer diameter of the assembled catheter. Moreover, intended positioning the distal inverted bond proximate the distal tip of the catheter may advantageously cause the inflated compliant balloon to protrude distally beyond the distal tip of the catheter, particularly suited for certain treatments. The compliant inflatable balloon when extending over or beyond the distal tip of the catheter may provide protection during delivery as the flexible, compliant balloon material is now the leading edge rather than the harder, less flexible, less compliant material of the catheter shaft. Furthermore, if aspiration through the main guidewire lumen of the catheter is employed during clot retrieval then the inflated portion of the balloon extending beyond the distal tip acts as a funnel guiding the clot into the main lumen of the shaft minimizing shearing of the clot, blockage or occlusion.

Figure 6A:
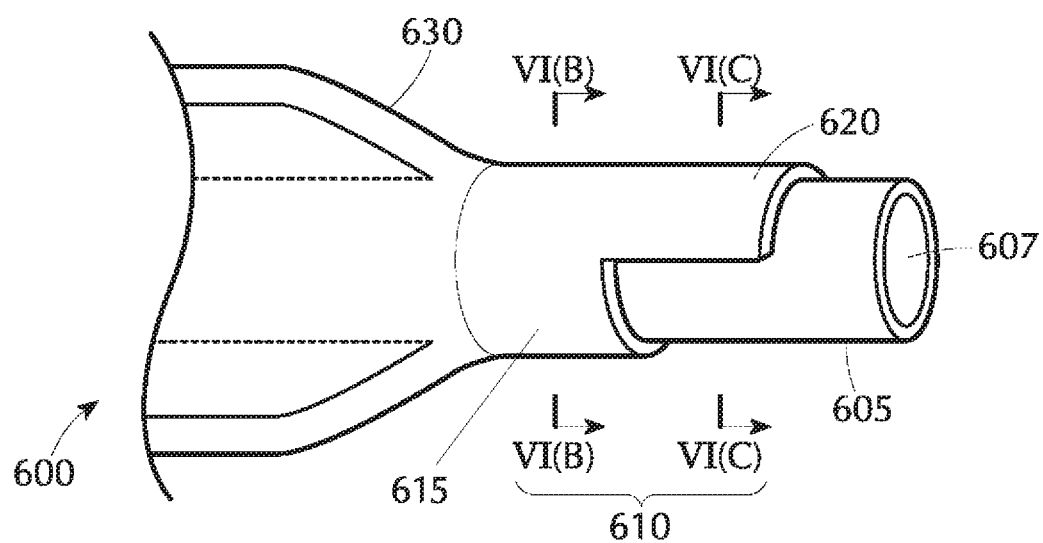
FIG. 6A is a partial side view of yet another configuration of the present inventive balloon guide catheter illustrating a skived proximal bond interface area of the compliant inflatable balloon sleeve including a skived proximal bond first section extending less than 360° (preferably approximately 180°) radially about the circumference of the catheter shaft and a skived proximal bond second section extending less than 360° (preferably approximately 180°) radially about the circumference of the catheter shaft.
Figure 6B:
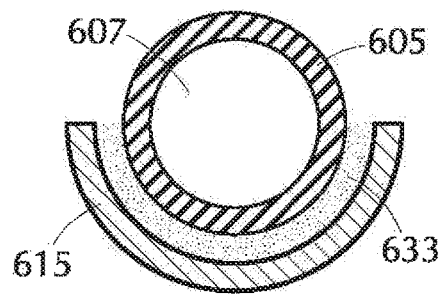
FIG. 6B is a radial cross-sectional view through the skived proximal bond first section of the skived proximal bond interface area of the compliant inflatable balloon of FIG. 6A along lines VI(B)-VI(B)
Figure 6C:
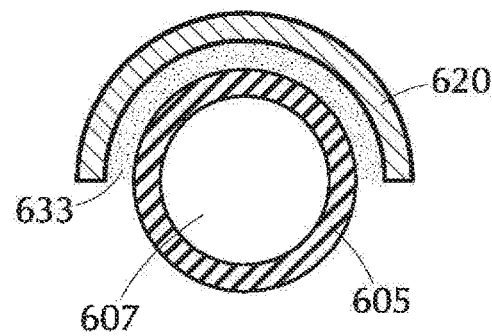
FIG. 6C is a radial cross-sectional view through the skived proximal bond second section of the skived proximal bond interface area of the compliant inflatable balloon of FIG. 6A along lines VI(C)-VI(C)
Figure 6D:
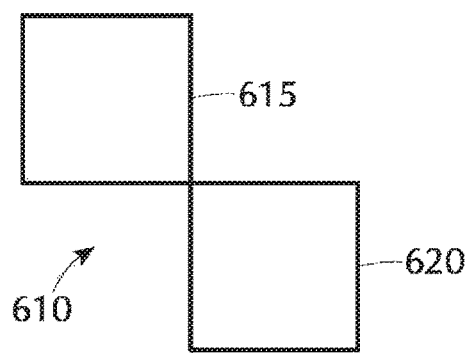
FIG. 6D represents the flattened skived proximal bond interface area of the compliant inflatable balloon of FIG. 6A.

Still another configuration calls for a skived bonding interface area of the compliant inflatable balloon with an exterior surface of the catheter shaft. By way of illustrative example, the balloon depicted in FIG. 6A is a compliant inflatable balloon, however, this configuration is suited for other type balloons (e.g., semi-compliant, or non-compliant). Compliant inflatable balloon sleeve 630 is secured to the exterior surface of the catheter shaft 605 along a skived proximal bond interface area 610 (shown in the side view of FIG. 6A) and/or an opposite skived distal bond interface area (the mirror opposite of that depicted in FIG. 6A), wherein each of the skived proximal and/or distal bond interface areas are skived at a right angle (in an axial/longitudinal direction). Skived proximal bond interface area 610 of the exemplary compliant inflatable balloon sleeve 630 shown in FIG. 6A is split into two sections, namely, a skived proximal bond first section 615 disposed distally of a skived proximal bond second section 620. Specifically, the skived proximal bond first section 615 extends less than 360° (preferably approximately 180°) radially about the circumference of the catheter shaft 605 (as shown in the radial cross-sectional view of FIG. 6B) and the skived proximal bond second section 620 extending less than 360° (preferably 180°) radially about the circumference of the catheter shaft 605 (as shown in the radially cross-sectional view in FIG. 6C). Skived proximal bond second section 620 preferably includes the proximal edge of the compliant inflatable balloon 630 and extends in a distal direction towards the skived proximal bond first section 615. Skived proximal bond first and second sections 615, 620 are radially offset relative to one another preferably with minimal or no radial overlap between contiguous bond sections (as clearly visible in FIG. 6D representing the flattened skived proximal bond interface portion 610 of the compliant inflatable balloon of FIG. 6A). Referring to the radial cross-sectional view in FIG. 6B, the skived proximal first section 615 covers radially 180° about the exterior surface of the catheter shaft 605, leaving exposed (uncovered) the remaining 180° of the catheter shaft 605. Likewise, the radial cross-sectional view in FIG. 6C shows the 180° exterior surface of the catheter shaft 605 exposed, i.e., not covered by the skived proximal second section 620 extending radially 180°. A biocompatible adhesive 633 is only applied to the exterior surface of the catheter shaft 605 in those regions covered by the respective skived proximal bond first and second sections 615, 620, as is illustrated in FIGS. 6B & 6C. To further enhance the bond, the skived proximal bond first and second sections may be subject to thermal bonding or laser bonding. By way of example, FIG. 6A-6C shows each bond interface area (proximal and distal) comprising two skived sections, each extending 180° radially about the circumference of the catheter shaft. More than two skived sections are possible in each bond interface area such as three skived sections each extending 120° radially about the circumference of the catheter shaft; or four skived sections each extending 90° radially about the circumference of the catheter shaft.

Figure 6E:
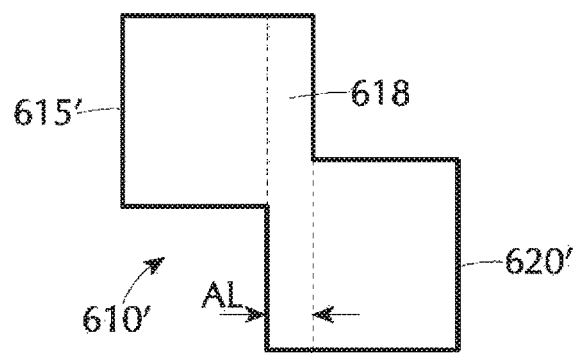
FIG. 6E represents an alternative design of the flattened skived proximal bond interface area of the compliant inflatable balloon that includes: (i) a skived proximal bond first section extending less than 360° (preferably approximately 180°) radially about the circumference of the catheter shaft; (ii) a skived proximal bond second section extending less than 360° (preferably approximately 180°) radially about the circumference of the catheter shaft; and (iii) disposed between the skived proximal bond first and second sections a non-skived proximal bond third section extending 360° radially about the circumference of the catheter shaft.

In a slight variation to that in FIGS. 6A-6C, to further enhance the bond between balloon and catheter shaft, each of the skived proximal and distal bond interface areas may include a non-skived third radial section 618 extending 360° radially about the exterior surface of the catheter shaft. By way of illustrative example, the non-skived third radial section 618 may be disposed in an axial/longitudinal direction between the skived first and second radial sections 615, 620 each extending radially 180° about the circumference of the catheter shaft. FIG. 6E represents the flattened proximal bonding area 610' of the compliant inflatable balloon with this alternative design. The axial length "AL" of the non-skived third radial section 618 is so small (e.g., less than or equal to approximately 0.5 mm), representing a negligible increase in outer profile or outer diameter of the assembled catheter having no discernible negative impact during use of the catheter. Accordingly, the non-skived third radial section 618 provides an enhanced 360° radial bond between the compliant inflatable balloon and exterior surface of the catheter shaft with negligible enlargement of the outer profile or outer diameter of the assembled catheter. Positioning or arrangement of the non-skived third radial section extending 360° about the exterior surface of the catheter shaft may be varied. Instead of the being disposed between the skived first and second radial sections 615', 620' (as shown in FIG. 6E), the skived first and second radial sections may be contiguous to one another, with the non-skived third radial section arranged contiguous with the free edge of either one of the skived first or second radial sections. These radially staggered or offset skived sections of each of the proximal and distal bond interface areas minimize the outer profile or outer diameter of the assembled catheter while cumulatively maintaining a secure bond 360° about the exterior surface of the catheter shaft.

Figure 7:
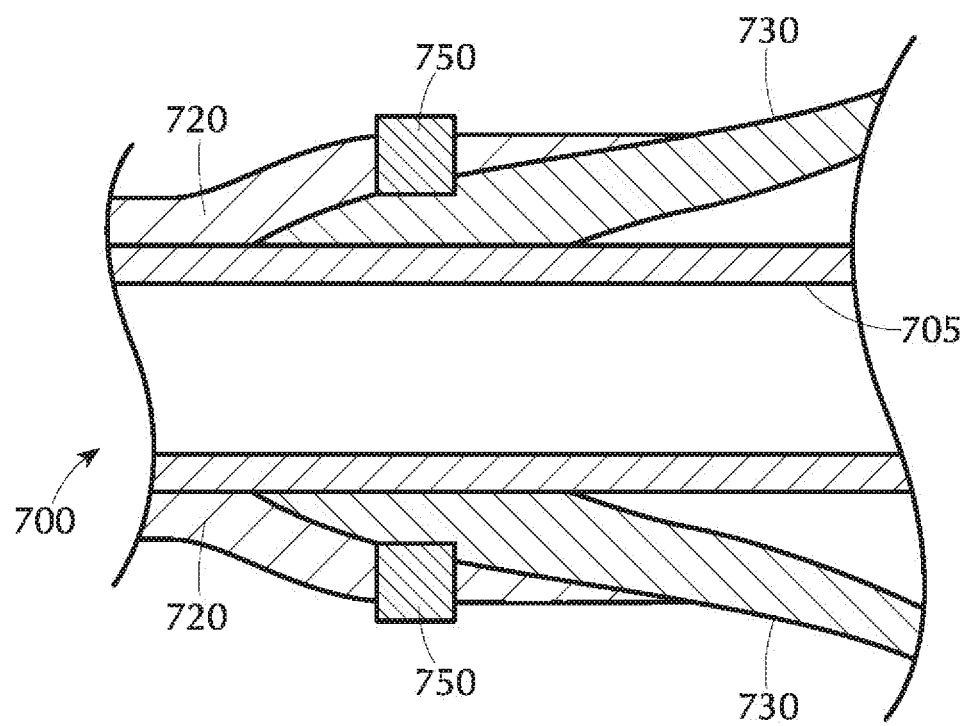
FIG. 7 is a partial longitudinal cross-sectional view of a marker band physically crimped about the proximal reflow jacket/sleeve securing beneath the proximal edge of the compliant inflatable balloon sleeve to the exterior surface of the catheter shaft.

To further reduce the occurrence of peel back, as an alternative to the inverted bond configuration (shown in FIGS. 5B & 5C), a non-inverted bond between the balloon and exterior surface of the catheter shaft may be subject to thermal, laser, and/or mechanical bonding. For example, a heat shrink sleeve may be disposed about the exterior surface of the balloon sleeve and subject to thermal or laser bonding. Still further enhancement of the integrity of the bond may be realized by a mechanical device (e.g., a band, preferably a marker band) physically crimped about the exterior surface of the heat shrink sleeve. FIG. 7 is a partial cross-sectional longitudinal view of a configuration in which the proximal bond interface area of the balloon 730 (e.g., compliant, semi-compliant, or non-compliant) and the exterior surface of the catheter shaft 705 is subject to both thermal bonding (e.g., heat shrink of reflow sleeve/jacket 720) and mechanical bonding (e.g., physically crimped metal marker band 750).

Figure 8A:
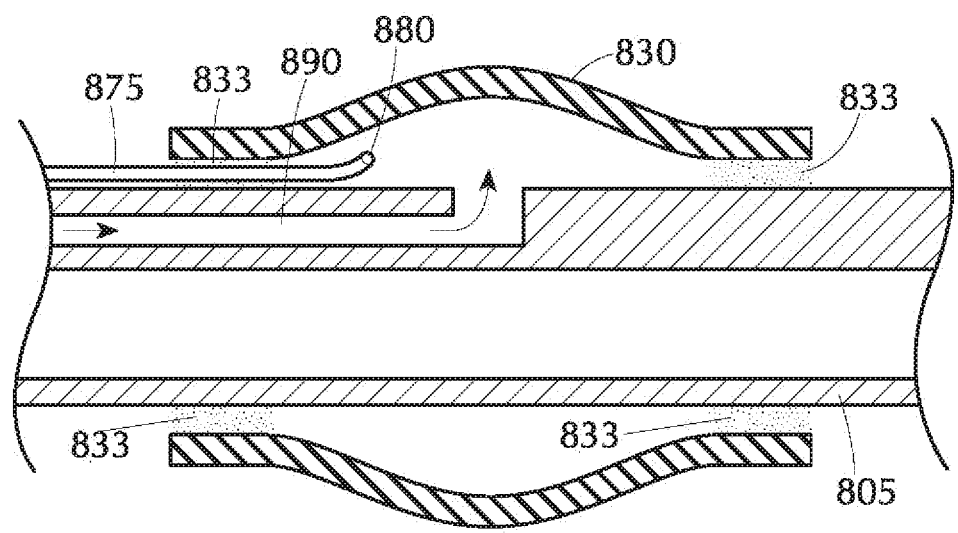
FIG. 8A is a partial longitudinal cross-sectional view of a compliant inflatable balloon with a longitudinal vent tube secured between the proximal bond interface area of the compliant inflatable balloon and the exterior surface of the catheter shaft, wherein the balloon is illustrated in an inflated state.

Prior to introduction into the body, the catheter is first "prepped" by exhausting any residual air from the compliant inflatable balloon. Several different configurations for purging the residual air from the compliant inflatable balloon are contemplated. One possible design is illustrated in FIG. 8A wherein a vent or exhaust tube 875 is a separate component from that of the catheter shaft 805. The diameter of the vent or exhaust tube 875 is selected to prevent the passage of the inflation fluid (e.g., contrast saline solution) therethrough, permitting only the residual air to be purged or exhausted. Factors to be taken into consideration when selecting the diameter of the vent or exhaust tube include the pressure in the balloon and the inflation fluid in the balloon (e.g., ratio of the mix of contrast and saline). The vent or exhaust tube 875 is secured between an exterior surface of the catheter shaft 805 and the balloon 830 (beneath either the proximal or distal bond interface area) using an adhesive 833. A discharge port or outlet 880 of the vent tube 875 is disposed within a cavity defined by the balloon 830 and the exterior surface of the catheter shaft 805. Prepping of the balloon 830 (i.e., purging of the residual air from the balloon) is accomplished by injecting an inflation fluid (e.g., contrast saline solution) into the balloon 830 via an inflation lumen 890 in the wall of the catheter shaft causing the residual air to be exhausted via the vent or exhaust tube 875 without the need for applying a vacuum.

The need for a separate vent or exhaust tube may be eliminated altogether, instead residual air being purged via a vent hole defined in the compliant inflatable balloon.

Figure 8B:
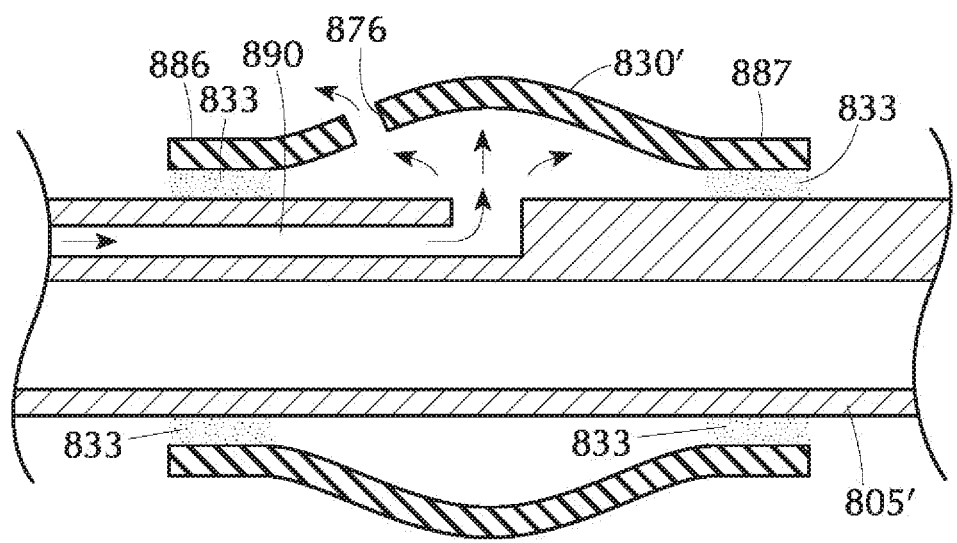
FIG. 8B is a partial longitudinal cross-sectional view of a compliant inflatable balloon with a vent hole defined therein located proximate the non-inverted proximal bond interface area of the compliant inflatable balloon secured to the exterior surface of the catheter shaft, wherein the compliant inflatable balloon is depicted in a partially inflated state.
Figure 8C:
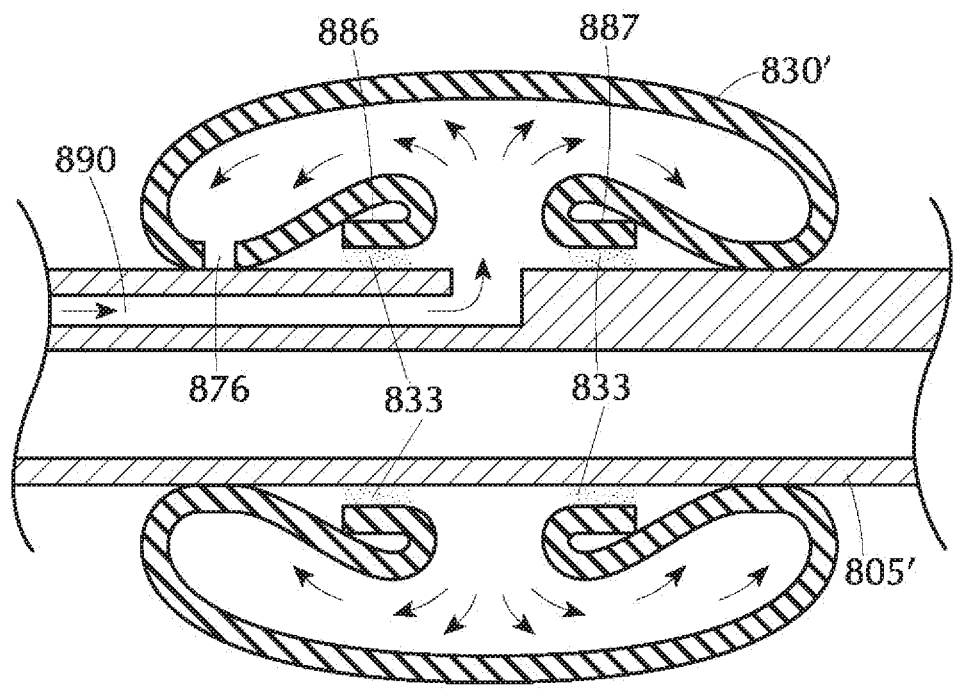
FIG. 8C is a partial longitudinal cross-sectional view of the compliant inflatable balloon of FIG. 8B in a further inflated state depicting a portion of the compliant inflatable balloon extending in a proximal direction over the non-inverted proximal bond interface area and physically contacting the exterior surface of the catheter shaft sealing the vent hole and prohibiting inflation fluid from exiting therethrough.

FIGS. 8B & 8C illustrate a compliant inflatable balloon 830' secured via a biocompatible adhesive 833 to the exterior surface of the catheter shaft 805' via non-inverted proximal and distal bonds 886, 887, respectively (i.e., bonds formed between an interior surface of the compliant inflatable balloon and an exterior surface of the catheter shaft). The vent or exhaust hole 876 in the compliant inflatable balloon 830' in the example depicted in FIGS. 8B & 8C is located proximate and distally of the non-inverted proximal bond 886. Specifically, the location of the vent or exhaust hole 876 is such that with continued inflation of the compliant inflatable balloon 830' that portion of the compliant inflatable balloon having the vent hole 876 defined therein extends over the non-inverted proximal bond 876 and physically contacts the exterior surface of the catheter shaft 805' thereby sealing the vent hole prohibiting the passage of the inflation fluid therethrough. Referring to FIG. 8B, during prepping of the catheter, an inflation fluid is injected via an inflation lumen 890 defined in an exterior wall of the catheter shaft 805' causing the compliant inflatable balloon 830' to expand and residual air therein to exit through the vent hole 876. Continued inflation causes that portion of the compliant inflatable balloon 830' having the vent hole 876 defined therein to extend over the non-inverted proximal bond 886 and physically contact the exterior surface of the catheter shaft 805', as shown in FIG. 8C. The increased pressure within the compliant inflatable balloon causes inward radial expansion of the balloon towards the shaft imposing on the extended portion of the balloon a radially inward force sealing the vent hole 876 against the exterior surface of the catheter shaft prohibiting passage of the inflation fluid therethrough and simultaneously minimizing peel back.

Figure 8D:
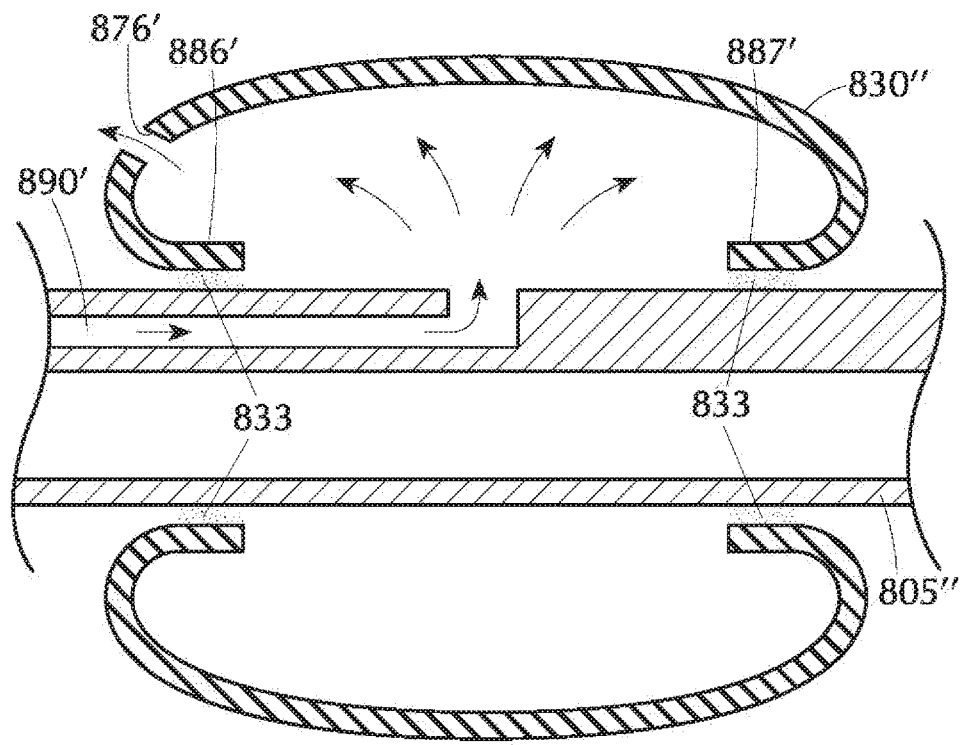
FIG. 8D is a partial longitudinal cross-sectional view of another configuration of the compliant inflatable balloon with a vent hole defined therein located proximate an inverted proximal bond interface area in which the compliant inflatable balloon is secured to the exterior surface of the catheter shaft, wherein the balloon is depicted in a partially inflated state.
Figure 8E:
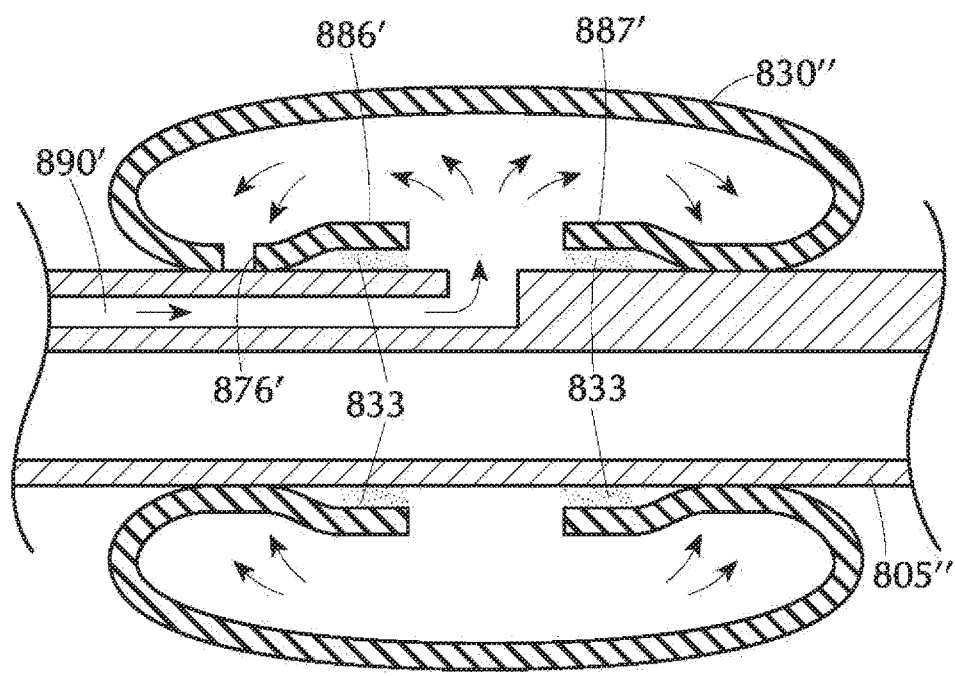
FIG. 8E is a partial longitudinal cross-sectional view of the compliant inflatable balloon of FIG. 8D in a further inflated state depicting a portion of the compliant inflatable balloon extending in a proximal direction over the inverted proximal bond interface area and physically contacting the exterior surface of the shaft sealing the vent hole thereby prohibiting the inflation fluid from exiting therethrough.

FIGS. 8D & 8E show yet another possible catheter configuration for purging of residual air via a vent or exhaust hole 876' in a compliant inflatable balloon 830" secured via a biocompatible adhesive 833' to the exterior surface of the catheter shaft 805" via inverted proximal and distal bonds 886', 887' (i.e., bonds formed between the inverted proximal and distal portions of the compliant inflatable balloon and exterior surface of the catheter shaft). In FIGS. 8D & 8E, the vent or exhaust hole 876' is depicted proximate and distally of the inverted proximal bond between the compliant inflatable balloon 830" and exterior surface of the catheter shaft 805". Specifically, the location of the vent or exhaust hole 876' is such that with continued inflation that portion of the compliant inflatable balloon 830" having the vent hole defined therein extends over the inverted proximal bond 886' and physically contacts the exterior surface of the catheter shaft 805" thereby sealing the vent hole prohibiting the passage of the inflation fluid therethrough. Referring to FIG. 8D, during prepping the inflation fluid is injected through the inflation lumen 890' defined in an exterior wall of the catheter shaft causing the compliant inflatable balloon 830" to inflate and residual air to exit through the vent hole 876' defined in the balloon. Continued inflation causes that portion of the balloon having the vent hole 876' defined therein to extend over the non-inverted proximal bond 886' and physically contact the exterior surface of the catheter shaft 805", as shown in FIG. 8E. The increased pressure within the compliant inflatable balloon imposes on the extended portion of the balloon a radially inward force against the exterior surface of the catheter shaft 805" sealing the vent hole 876' and prohibiting passage of the inflation fluid therethrough.

The different aspects, features, designs and configurations of the invention may be combined, as desired, for a given intravascular catheter with the intended goals of enhancing the integrity and strength of the bond between the balloon and the catheter shaft, while simultaneously minimizing the outer profile or outer diameter of the assembled catheter.

Thus, while there have been shown, described, and pointed out fundamental novel features of the invention as applied to a preferred embodiment thereof, it will be understood that various omissions, substitutions, and changes in the form and details of the systems/devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A balloon guide catheter comprising:
 a catheter shaft having defined longitudinally therein a central lumen and an inflation lumen substantially parallel to the central lumen; the catheter shaft having a braid in a configuration in which the braid is woven about the inflation lumen so that a first portion of the braid extends radially outward relative to the inflation lumen while a second portion of the braid extends radially inward relative to the inflation lumen; and the braid encompassing the central lumen as well;
 a balloon disposed about the braid; the balloon has a distal edge and an opposite proximal edge; and
 at least one reflow jacket without anything disposed therebetween the at least one reflow jacket and the balloon; the at least one reflow jacket directly covering the proximal and distal edges of the balloon; the at least one reflow jacket made of a material reflowable together with the proximal and distal edges of the balloon into the braid securing the balloon to the catheter shaft; wherein an exposed portion of the balloon is not covered by the at least one reflow jacket.

2. The balloon guide catheter of claim 1, wherein the at least one reflow jacket comprises two reflow jackets including: (i) a proximal reflow jacket overlapping the proximal edge of the balloon; and (ii) a distal reflow jacket overlapping the distal edge of the balloon; wherein the proximal and distal reflow jackets extend radially 360° about a circumference of the catheter shaft and are separated from one another in an axial direction forming a 360° radial gap therebetween revealing the exposed portion of the balloon; and wherein in an inflated state the exposed portion of the balloon protrudes radially outward in the 360° radial gap.

3. The balloon guide catheter of claim 1, wherein the balloon guide catheter has a single reflow jacket extending radially 360° about a circumference of the catheter shaft; the single reflow jacket having an opening that coincides with but smaller in dimension than a perimeter of the balloon revealing therethrough the exposed portion of the balloon.

4. The balloon guide catheter of claim 1, wherein the first portion of the braid does not extend longitudinally to a distal portion of the inflation lumen coinciding with the at least one reflow jacket.

5. The balloon guide catheter of claim 1, wherein the first portion of the braid extends longitudinally to a distal portion of the inflation lumen coinciding with the at least one reflow jacket.

6. The balloon guide catheter of claim 1, wherein the balloon is in direct physical contact with the catheter shaft free of adhesive therebetween.

* * * * *